(12) United States Patent
Wilson

(10) Patent No.: US 7,458,161 B2
(45) Date of Patent: Dec. 2, 2008

(54) ROTARY CUTTING DEVICE

(75) Inventor: Graham John Wilson, Wirral (GB)

(73) Assignee: Graton Holdings Limited, Liverpool (GB)

( * ) Notice: Subject to any disclaimer, the term of this patent is extended or adjusted under 35 U.S.C. 154(b) by 0 days.

(21) Appl. No.: 10/489,129

(22) PCT Filed: Aug. 22, 2002

(86) PCT No.: PCT/GB02/03889

§ 371 (c)(1),
(2), (4) Date: Mar. 8, 2005

(87) PCT Pub. No.: WO03/020010

PCT Pub. Date: Mar. 13, 2003

(65) Prior Publication Data
US 2005/0172600 A1    Aug. 11, 2005

(30) Foreign Application Priority Data
Sep. 5, 2001    (GB) ................... 0121447.7

(51) Int. Cl.
*B26B 7/00* (2006.01)
(52) U.S. Cl. .......................... 30/276; 56/17.5
(58) Field of Classification Search ............ 56/255, 56/12.7, 17.5, 295, DIG. 17, DIG. 20; 30/276
See application file for complete search history.

(56) References Cited

U.S. PATENT DOCUMENTS

| 1,336,257 | A | * | 4/1920 | Muzzy | 56/295 |
|---|---|---|---|---|---|
| 2,532,982 | A | * | 12/1950 | DeYoung | 30/390 |
| 2,909,885 | A | * | 10/1959 | Smith | 56/11.9 |
| 3,332,147 | A | * | 7/1967 | Legge | 30/240 |
| 3,389,464 | A | | 6/1968 | Pederzoli et al. | |
| 3,417,470 | A | * | 12/1968 | Damon | 30/276 |
| 3,520,120 | A | * | 7/1970 | Hardin, Jr. | 56/11.9 |
| 3,631,658 | A | | 1/1972 | Green | |
| 4,320,617 | A | | 3/1982 | Fedeli | |
| 4,329,834 | A | * | 5/1982 | Hetrick | 56/295 |
| 4,520,619 | A | * | 6/1985 | Doi et al. | 56/320.1 |
| 4,672,744 | A | | 6/1987 | Jackson et al. | |
| 5,398,489 | A | | 3/1995 | Oshima | |
| 5,626,008 | A | * | 5/1997 | Puszkar | 56/17.5 |
| 5,642,609 | A | * | 7/1997 | Morrison | 56/255 |
| 5,862,595 | A | * | 1/1999 | Keane | 30/124 |
| 6,105,253 | A | * | 8/2000 | Kolbert | 30/124 |
| 6,470,662 | B1 | * | 10/2002 | Burke et al. | 56/255 |

FOREIGN PATENT DOCUMENTS

| DE | 3136172 A1 | * | 3/1983 |
|---|---|---|---|
| DE | 41 20 278 A1 | | 12/1992 |
| GB | 2 266 648 A | | 11/1993 |

\* cited by examiner

*Primary Examiner*—Thomas B Will
*Assistant Examiner*—Alicia Torres
(74) *Attorney, Agent, or Firm*—Blakely, Sokoloff, Taylor & Zafman LLP

(57) ABSTRACT

A horticultural or agricultural cutting device is disclosed which comprises a body (4), a rotor (20) rotatably coupled to the body, at least one cutter (54), (56) which rotates along with the rotor and extends radially to the axis of rotation, and a powered drive (eg. an electric motor (40)) which drives the rotor and cutter. The rotor provides a collection surface (58). (60) which follows the cutter as it rotates and so serves to collect cut material. The rotor is formed such as to expel the cut material centrifugally and the body provides a roughly tangential collection channel away from the rotor along which the collected material is thereby propelled. The collection channel is led to a waste receptacle.

15 Claims, 14 Drawing Sheets

ROTARY CUTTING DEVICE

CROSS-REFERENCE TO OTHER APPLICATIONS

This Application is a National Phase of International Application No. PCT/GB02/03889, filed on Aug. 22, 2002, which claims priority from Great Britain Patent Application No. 0121447.7, filed on Sep. 5, 2001.

The present invention relates to, a rotary cutting device. The device in question may be for horticultural or agricultural use or may alternatively be for use in food preparation.

The inventor's earlier patent GB 2266648B discloses a tool for use in the garden, or in the workshop, which uses a rotating cutter juxtaposed (and in some embodiments integrally formed) with a helical rotor. In operation of the main embodiment described, cut material is collected by virtue of the rotor and also propelled thereby, partly by the operation of the rotor as an archimedean screw and partly by flow of air produced by the rotor, along a path which is generally axial, with respect to the axis of rotation of the rotor and cutter, to a collection receptacle.

The cutter/rotor combination proposed in the earlier patent has proven to be highly effective. The construction of the device has however been developed with two particular aims:— i) to arrive at a device which can be formed as a well balanced, compact unit; and ii) to avoid undue manufacturing cost.

In fact in developing the device a new principle of operation has been arrived at which is considered to have a broad range of potential applications.

In accordance with a first aspect of the present invention there is a rotary cutting device comprising a body, a rotor housed in the body adjacent an opening therein, the rotor being journalled upon the body for rotation about an axis, and a powered drive mounted to the body for rotationally driving the rotor, wherein the rotor has at least one paddle having a leading edge which extends radially with respect to the axis and serves as a cutter, being exposed to the exterior of the body by virtue of the aforementioned opening so that it can be contacted with material to be cut, the paddle also providing a collection surface which faces the interior of the body and follows the cutter as the rotor rotates, serving to collect cut material into the body, a wall of the body encircling the rotor and having an opening leading to a substantially tangential collection channel formed by the body, and the rotor being formed such as to expel the cut material centrifugally whereby the cut material is propelled into the collection channel.

The path defined by the body need not be at a precise tangent to the rotating cutter and rotor. The essential point is that it must be suitable to receive material thrown centrifugally off the rotor. In this respect the present invention differs from the embodiments described in GB 2266648, wherein the archimedean screw action of the impeller drives the waste material along an axial path.

It has been found that the present invention makes possible a very compact and attractive unit. The rotor of the present invention may also be designed for economical manufacture.

In an especially preferred embodiment of the present invention, the collection surface is inclined, along the circumferential direction, to its plane of rotation such as to propel the cut material into the body.

Hence in this embodiment the collection surface moves the cut material along the axial direction, into the body, before it is tangentially expelled by centrifugal action. The collection surface may even be formed as a helix.

Preferably, the collection surface is followed by an upstanding vane surface by means of which the cut material is centrifugally expelled.

The cutting device is most preferably a horticultural or agricultural device. Alternatively however the device may be for use in food preparation—enabling rapid slicing and collecting of foods.

The powered drive may be an internal combustion engine or a hydraulic motor, although an electric motor is especially referred.

In accordance with a second aspect of the present invention there is a rotary cutting device comprising a body, a rotor journalled upon the body for rotation about an axis, and a powered drive coupled to the rotor for rotational driving thereof, a pair of pinions being mounted upon the rotor on opposite sides of the rotor axis and a power driven saw chain being led around the pinions to provide a chain saw which extends radially with respect to the axis and rotates along with the rotor.

Drive for the chain saw may be provided through a central drive gear engaged with the saw chain. The gear is most preferably co-axial with the rotor.

Specific embodiments of the present invention will now be described, by way of example only, with reference to the accompanying drawings in which:—

In construction of the trimmer 2 illustrated in FIGS. 1 to 5, extensive use is made of injection moulded plastics. Other embodiments could however be constructed using other materials eg. pressed sheet metal or die cast aluminium.

Figure 2:
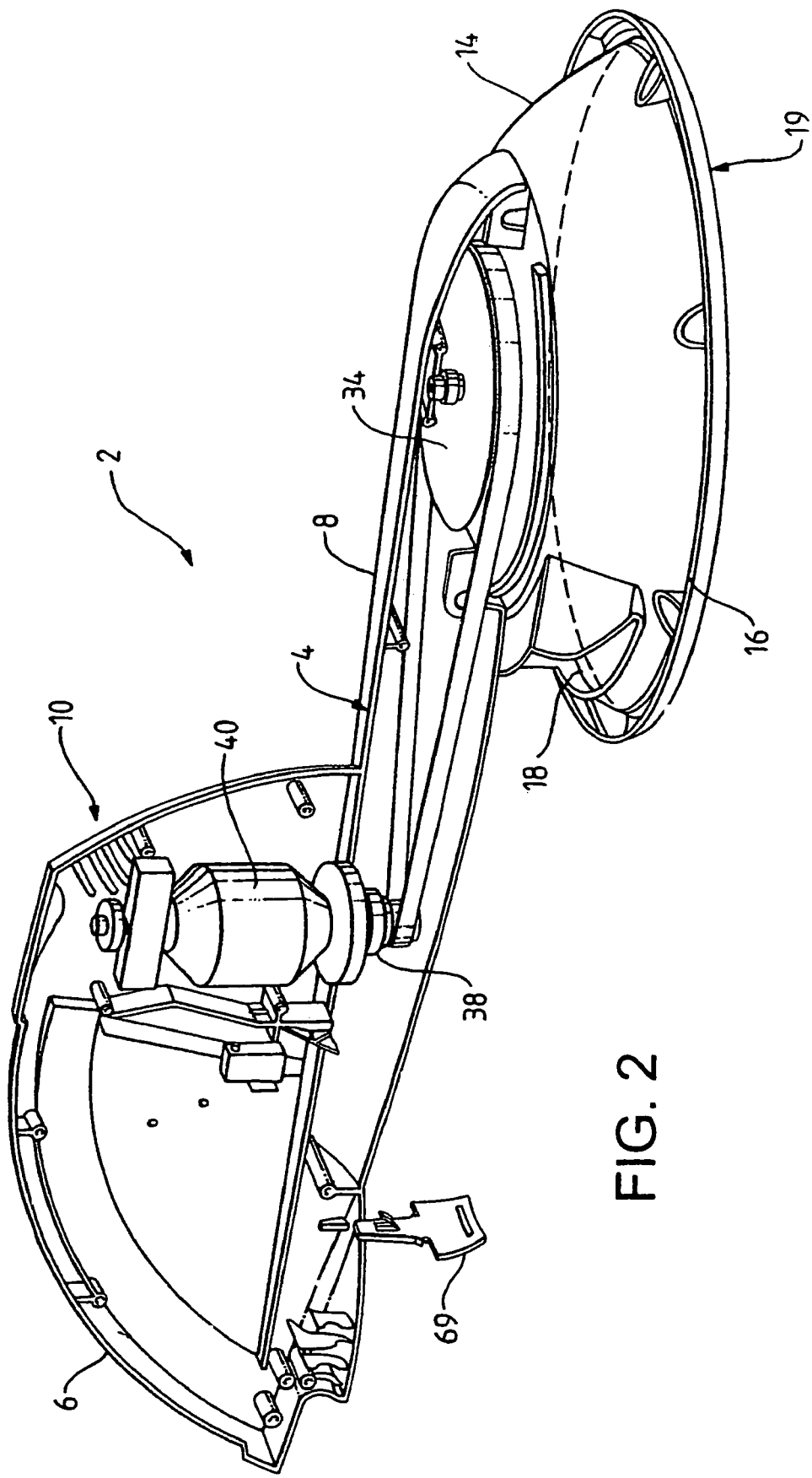
FIG. 2 is a perspective illustration of an essentially similar trimmer embodying the present invention, one half of a casing and also a waste collection receptacle being omitted to expose parts of the mechanism of the trimmer.
Figure 3:
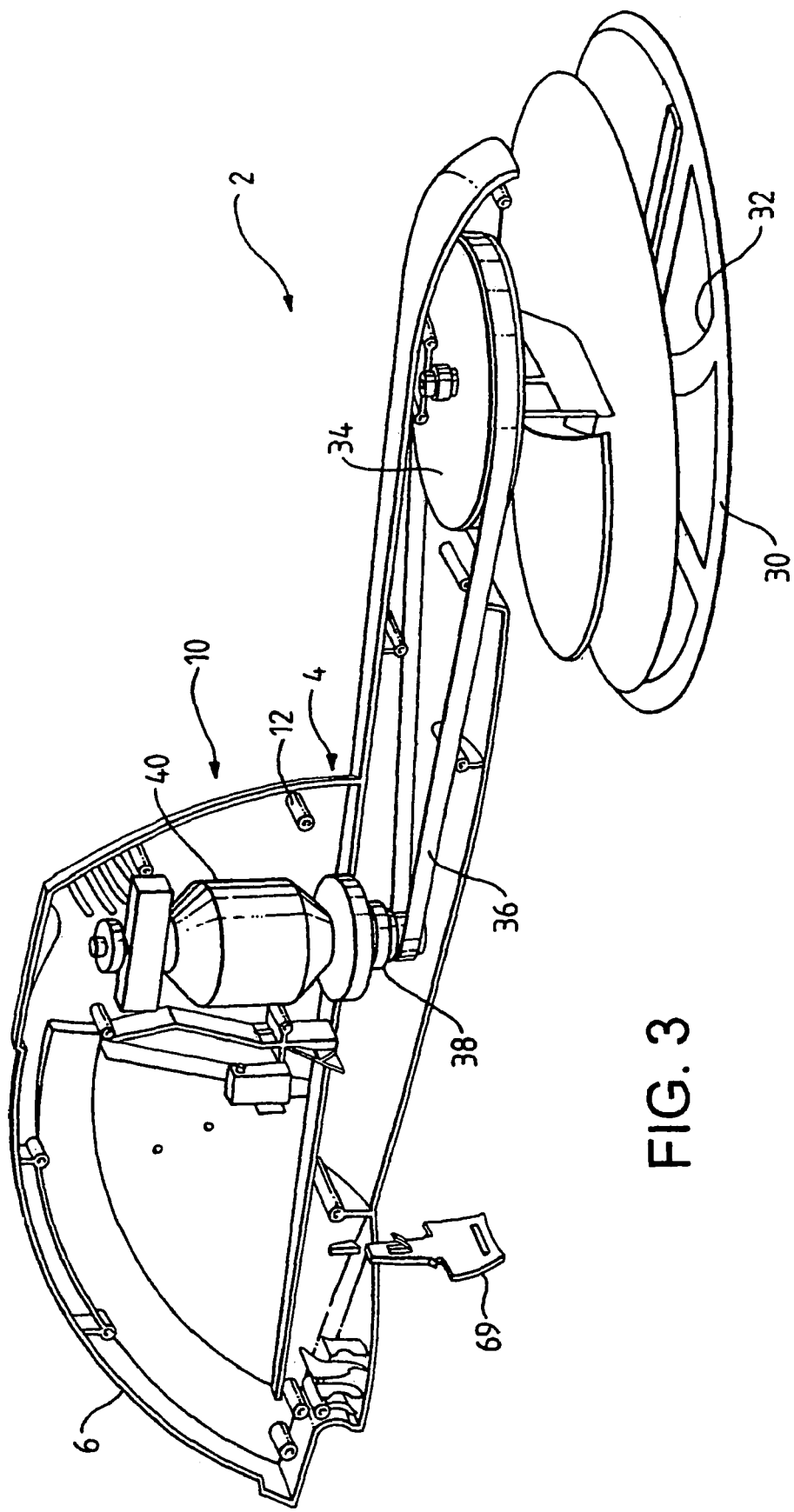
FIG. 3 is a similar perspective illustration to FIG. 2 but omits a further part of the casing in order to expose a rotor of the trimmer and other components.

The trimmer can be seen in FIGS. 2 and 3 to have a body 4 formed from several plastics components. A handle portion 6 and arm portion 8 of the body are both defined by a casing 10 which is vertically split into two halves, joined together during assembly in the present embodiment by screws (not shown, although screw holes 12 can be seen). At its end remote from the handle portion 6, the arm portion 8 is joined to a generally annular shroud 14, formed as a separate plastics moulding. The shroud 14 is outwardly tapered from top to bottom and has an upturned lip 16 which contributes rigidity to this component. The shroud also has an opening 18, through which cut material is propelled in use, as will be explained below.

Figure 1:
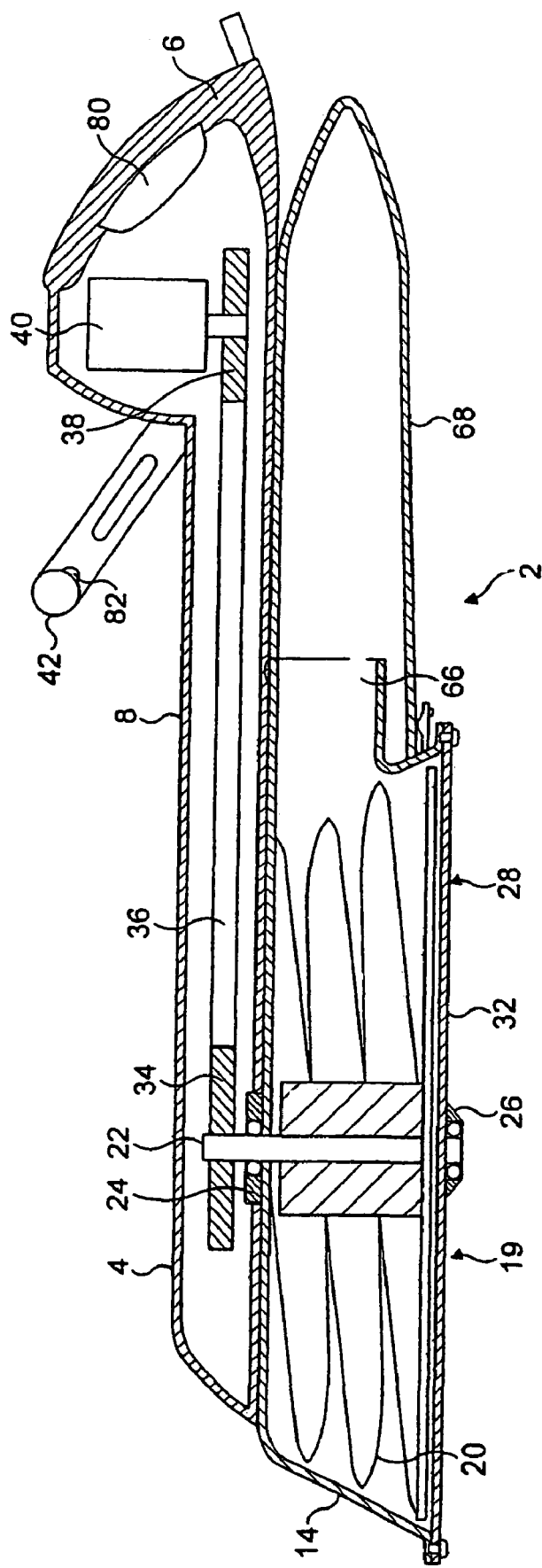
FIG. 1 is a somewhat simplified and stylised vertical section through a garden trimmer embodying the present invention.

Contained in the shroud is a rotor 20 which will be described in more detail shortly. The rotor 20 is mounted on a shaft 22 (as FIG. 1 shows) which is journalled in an upper bearing 24 mounted by the shroud and also in a lower bearing 26 mounted by a cut away plate 28. The plate 28 is itself mounted across the otherwise open, lowermost mouth 19 of the shroud 14 and in the present embodiment is cut away to provide a circular perimetral band 30 linked by radial spokes serving as static blades 32 (see FIG. 3 in particular) to a central hub portion which receives the lower bearing 26.

Above the rotor 20 a rotor pulley 34 is fixed upon the shaft. A toothed drive belt 36 couples the rotor pulley to a motor pulley 38 mounted on the drive shaft of an electric motor 40 mounted in the handle portion 6 of the casing 10. The rotor pulley 34 is of larger diameter than the motor pulley 38 so that the rotor 20 is driven to rotate more slowly than the motor 40.

The use of a drive belt 36, extending through the arm portion 8, allows for a particularly well balanced, attractive construction. In use the weight of the trimmer is supported largely by means of a main handle 42, seen in FIG. 1 but omitted from FIGS. 2 and 3, projecting upwardly and forwardly from the handle portion 6. The heavy components—electric motor 40 and the rotor 20 and its associated parts are on either side of the handle and so balance each other. That is, by separating these parts using the belt drive, the trimmer's centre of gravity is positioned at or near to main handle 42.

Figure 4:
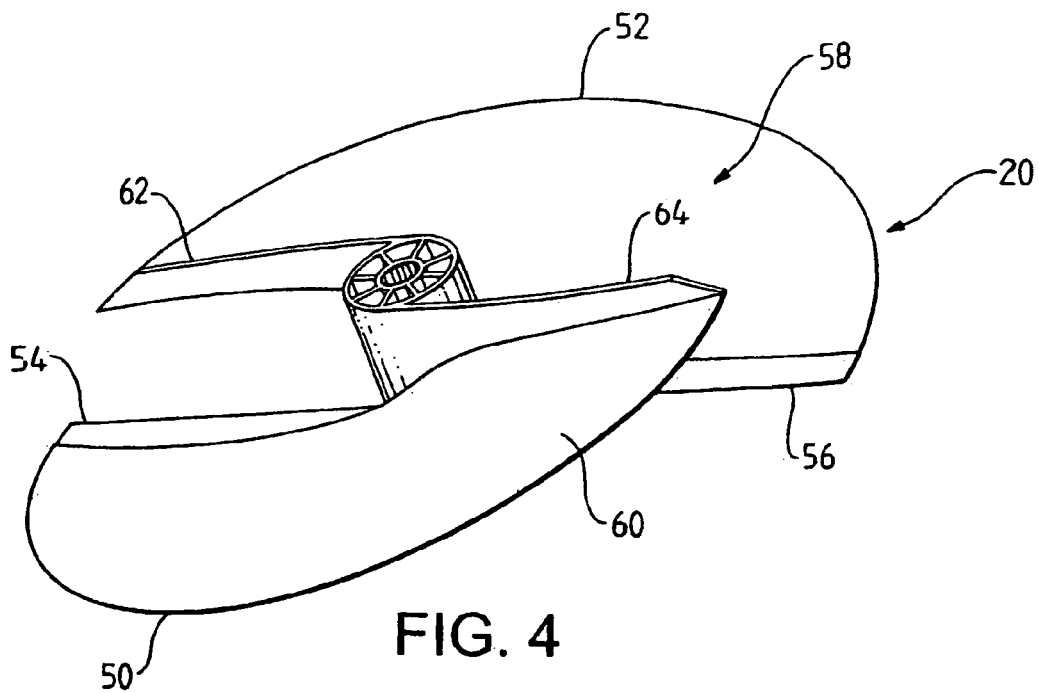
FIG. 4 is a perspective illustration of a first rotor for use in the trimmer, viewed from above and to one side.
Figure 5:
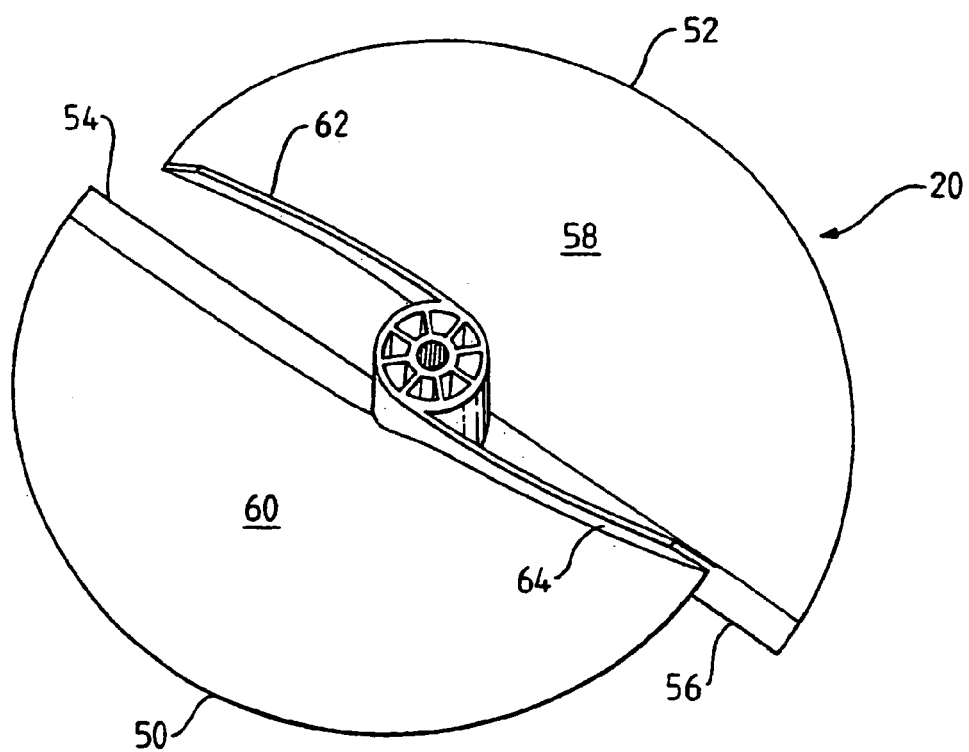
FIG. 5 is a perspective illustration of the same rotor, viewed more obliquely.

Turning now to FIGS. 4 and 5, the preferred form of the rotor can be seen to comprise two paddles 50, 52 each forming 180° of a shallow pitched helix. Thus, along the circumferential direction, the paddles are both inclined to the plane of rotation. The leading, lowermost, edge of each paddle is formed as a radially extending cutter. More specifically, in the illustrated embodiment, each of these edges 54, 56 is sharpened to form a radially extending blade. While the rotor is formed of plastics, it is found that a sufficiently durable edge can be formed thereupon. Alternative constructions could use a metal blade attached to the rotor, or in more robust embodiments possibly a pressed steel rotor with a sharpened cutter edge. In fact the most preferred embodiment comprises a rotor principally formed of moulded plastics but having a sharpened metal leading edge 54, 56. These metal edges are incorporated in the rotor during the moulding process.

Uppermost surfaces 58, 60 of the paddles 50, 52 are referred to herein as "collection surfaces" because they serve to collect material cut by the blades 54, 56. These surfaces are, as can be seen, continuous with the portion of the rotor forming the blades 54, 56. As the rotor rotates, the collection surfaces 58, 60 follow the blades so that the cut material rides up these surfaces and is thus collected. Following the collection surfaces 58, 60 and again formed as integral parts of the rotor 20, are upstanding vanes 62, 64. When the vanes reach the cut material they cause it to move rotationally along with the rotor and the material is consequently also propelled radially outwardly by centrifugal force. The effect is akin to a slingshot. When material reaches the opening 18 in the shroud it is consequently propelled along a generally radial path through the opening 18, along a short duct 66 and so, into a waste collection receptacle 68 (shown in FIG. 1).

It should be noted that the leading edge of one paddle overlaps the trailing edge of the other. This helps to prevent spillage of material. Thus the blade 56 is ahead of the vane 64, in the circumferential direction of travel, and likewise the blade 54 leads the vane 62 as the rotor turns. The shape of the rotor also equips it to function as an impeller, drawing air into the body and in particular into the collection receptacle 68. This movement of air assists in collection of the cut material.

The waste collection receptacle 68 is in the present embodiment provided by a plastics moulding mounted to the underside of the casing 10. It is removable for emptying. FIGS. 2 and 3, from which the receptacle itself is omitted, show a trigger catch 69 by means of which the receptacle 68 is normally retained and by means of which the user can release it.

The cutting action of the blades 54,56 is to some degree assisted by the static blades 32 of the cut away plate 28, which tend to keep material such as grass and hedge stalks in place as the blades move past to produce the cut. However it has been found to be unnecessary for the blades 54, 56 and the static blades 32 to come into contact, and by separating the blades 54, 56 upwardly from the static blades noise is reduced without impairing performance of the trimmer. The static blades 28 need not be sharpened in order to perform their function.

Various designs of the blades 54, 56 may be utilised. They may for example be curved, as viewed along the rotational axis, in the manner of a scythe. Note that while the blades have been referred to as extending radially, as they must, this does not imply that they must be actually parallel to the radial direction.

The static blades may take any of a variety of forms. They could for example form a grid. The accurate spoke form seen in FIG. 3 is however considered advantageous in providing a shearing cut.

The trimmer illustrated in FIGS. 1 to 5 can be held in two hands for trimming of hedges, long grass, etc. One hand holds the rearmost handle portion 6 to guide the device while the other hand holds the main handle 42 to support its weight. Safety is of course an important design issue. In order to prevent the user from inadvertently inserting either hand into the rotating blades, the present embodiment is adapted to bring the blades to a halt in the event that the user releases either of the handles 6, 42. A first switch is formed within the handle portion 6 and controlled by an elongate pad 80 projecting forwardly from the handle portion 6 (see FIG. 1). A second switch is controlled by a pad 82 which is arranged to be grasped along with the main handle 42. Wiring of the two switches to the motor 40 is such that only when pressure is applied to both pads 80, 82 is the motor activated. Preferably both switches are normally "off", being switched to "on" only by pressure applied to their respective pads, and are in series with each other.

The effect is that to activate the device the user must place one hand on the handle portion 6 (and press its pad 80) and the other hand on the main handle 42 (and press its pad 82). Hence neither hand can be offered up to the rotating blades.

Figure 17:
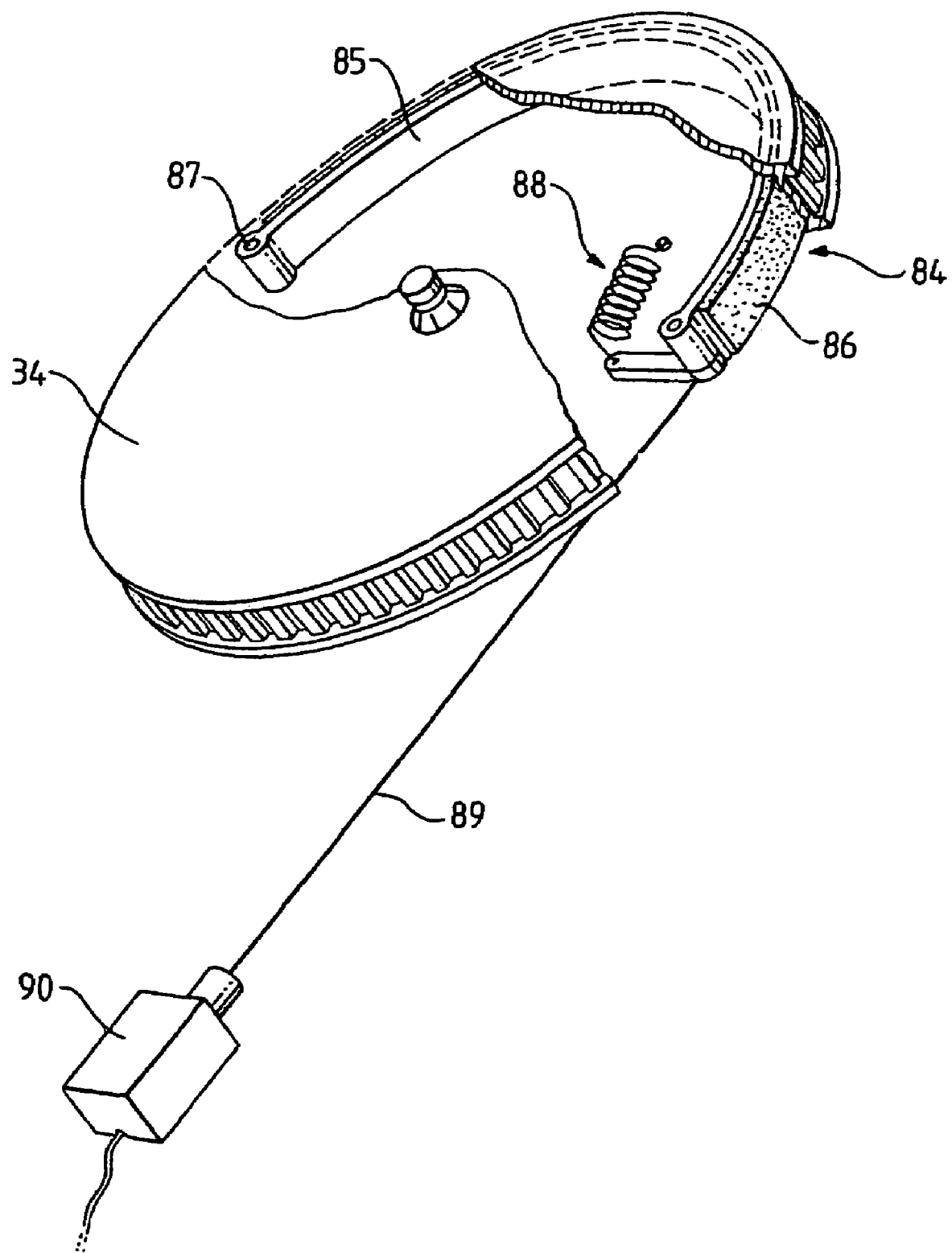
FIG. 17 is a simplified illustration of a brake mechanism used in certain embodiments of the present invention.

Inertia tends to cause the rotor 20 to continue rotating after current to the motor is switched off. To overcome this tendency the trimmer incorporates a brake mechanism which is released only when the motor is switched on. For the sake of representational clarity the brake mechanism is omitted from FIGS. 1 to 5 but is illustrated separately in FIG. 17. It comprises a brake shoe assembly 84 within the rotor pulley 34, the brake shoe 85 itself being a part circular member bearing an outer brake lining 86 and being pivotally mounted at 87. A spring 88 urges the brake shoe 85 into contact with the inner surface of the pulley 34 to apply the brake and stop the pulley and hence also the rotor 20. The brake is released by means of a solenoid 90 acting on the shoe through a flexible line 89 formed in the illustrated embodiment of nylon. Tension in the line, produced by the solenoid in response to passage of electric current therethrough, pulls the brake shoe away from the pulley surface.

The solenoid is energised only when the motor current is on and therefore stops the pulley 34 when current to the motor ceases, either because one of the switches is turned off or because of an electrical failure.

In a more economical alternative construction (not illustrated) the solenoid is dispensed with and the action of depressing one or other (or both) of the switches causes the brake to be released, e.g. by means of the line 89 being led to one of the switch pads 80, 82.

Figure 6:
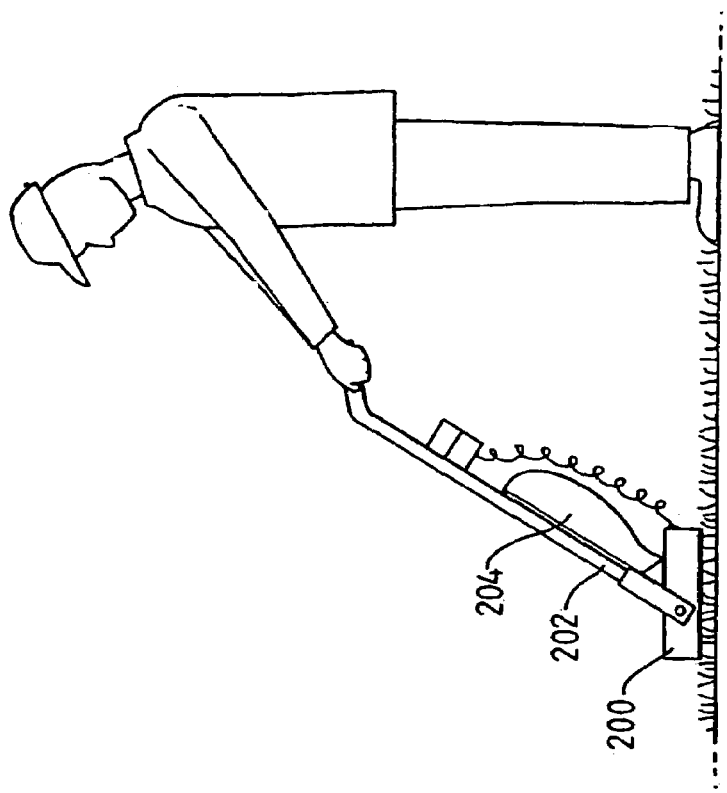
FIG. 6 is an illustration of a wheeled carrier with the trimmer mounted thereupon for use in trimming the edge of a lawn.

The trimmer (or more preferably a more compact version of it, to be described below with reference to FIGS. 8 to 10) can be used in trimming the edge of a lawn, and for this purpose is fitted to a wheeled carrier as illustrated in FIG. 6, wherein the carrier 100 itself is seen to have a wheel 101 (a skid could instead be used) coupled through an upright 102 and a spacer arm 104 to an elongate handle 106. The trimmer itself is indicated at 108, being mounted upon the carrier 100 with the axis of rotation of the rotor generally horizontal. Hence the trimmer blades (not themselves visible in these drawings) face toward the edge 110 of the lawn in order to trim the lawn edge. The wheel supports and guides the trimmer as it is moved along the edge of the lawn.

In this configuration the waste collection receptacle 68 is not utilised. Instead the output from the duct 66 of the trimmer is led through a flexible tube 112 to a separate waste receptacle such as a bag. The separate receptacle, not itself illustrated, need not be carried along with the trimmer and so can have a larger volume than the waste collection receptacle 68. The receptacle may for example be a bag placed on the ground and connected to the trimmer through a flexible tube.

It is found that the air flow due to the impeller action of the rotor 20, in addition to the slingshot effect of the rotor, serves to propel the waste material along the tube 112. The air flow also assists by inflating the collection bag and so preparing it to receive material. A collapsible tube, eg of thin plastics, may be used as this too is inflated in use by the rotor's impeller action.

Figure 7:
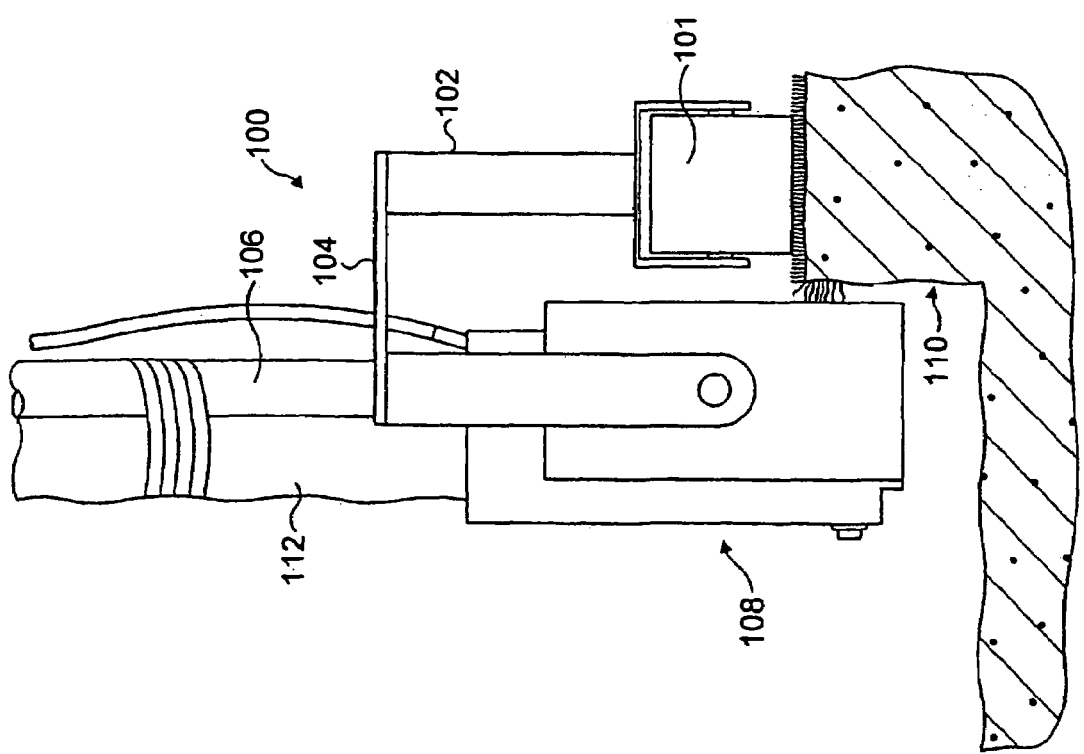
FIG. 7 is an illustration of an arrangement in which the trimmer is mounted upon an elongate handle.

A further configuration in which the trimmer, or a smaller, lighter version of it, may be used is illustrated in FIG. 7. The trimmer is here labelled 200 and is coupled, and inclined, to an elongate handle 202 supporting a waste bag 204 to which the trimmer's output is fed. Here the user, holding the handle 202, supports the weight of the trimmer and moves it over ground to trim eg. long grass.

Figure 8:
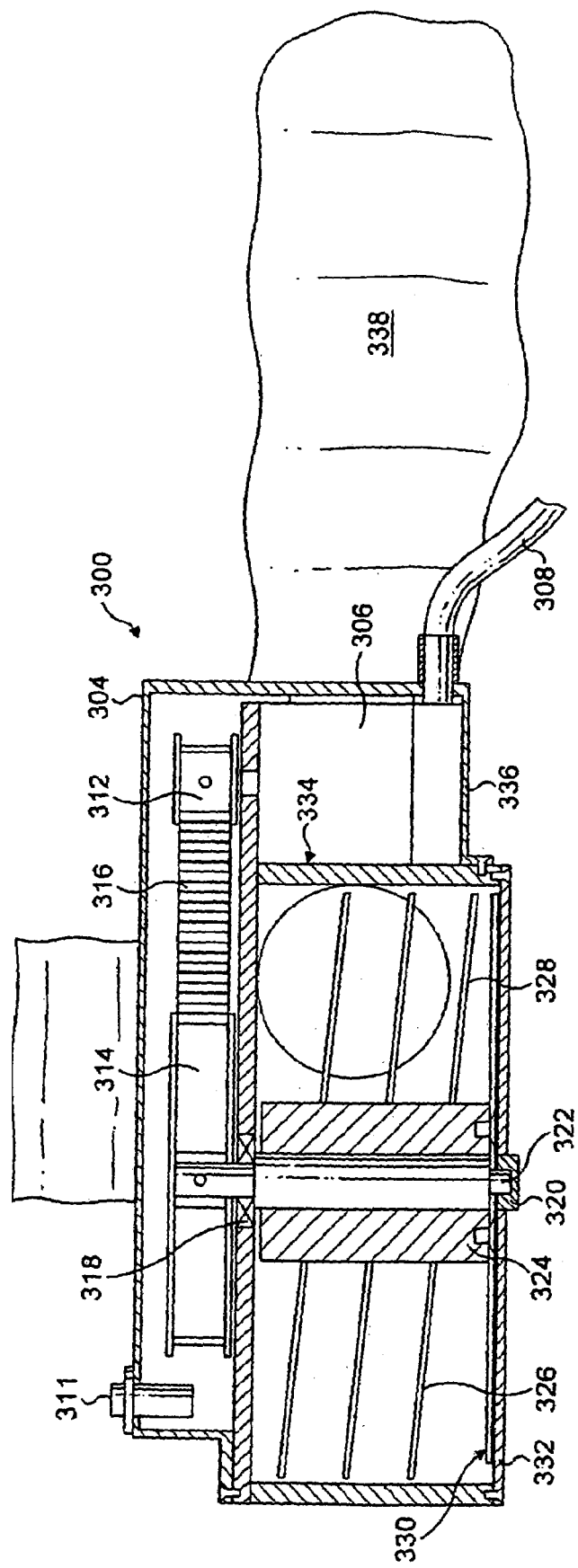
FIG. 8 is a vertical section through a mini-trimmer constructed in accordance with the present invention.
Figure 9:
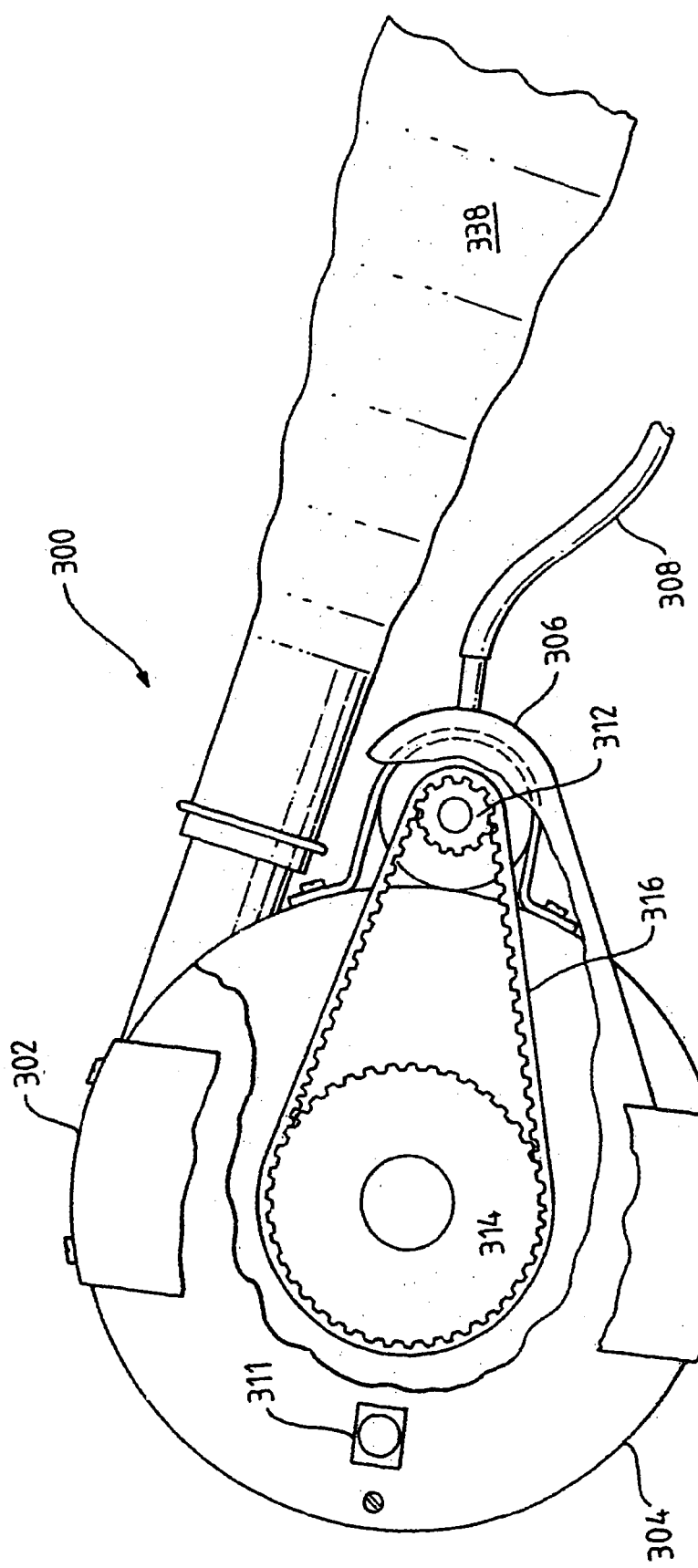
FIG. 9 is a plan, partly cut-away view of the mini-trimmer.
Figure 10:
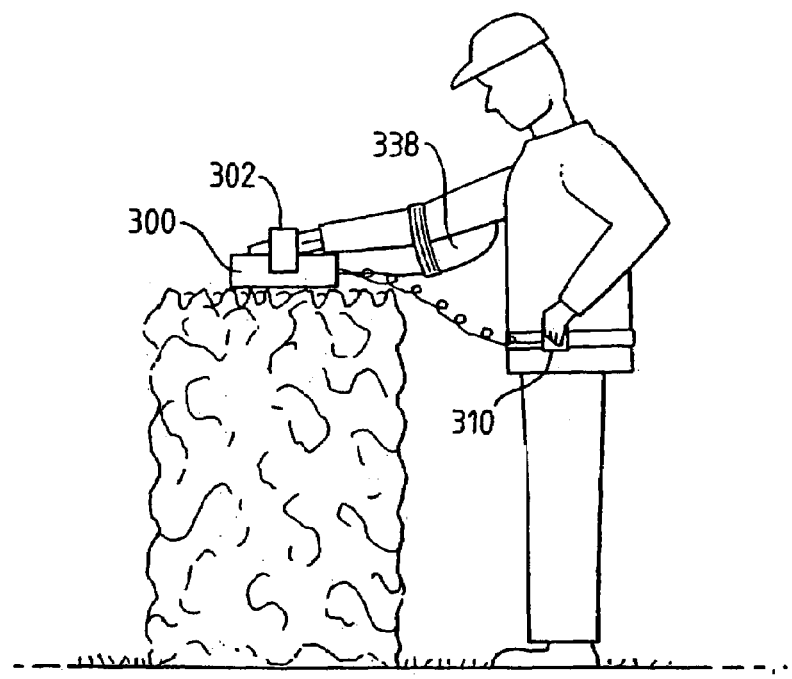
FIG. 10 illustrates the mini-trimmer in use.

A further embodiment of the invention is illustrated in FIGS. 8, 9 and 10.

This version is a mini-trimmer 300 to be held in one hand, preferably by means of a strap 302 as FIG. 10 makes clear.

The mini-trimmer comprises a casing 304 within which is mounted an electric motor 306 whose power supply comes through a supply cable 308. While the mini-trimmer could be mains powered, the present embodiment is powered from a separate battery pack 310 carried on the user's belt (see FIG. 10) and connected to the trimmer through the cable 308. The battery pack also carries a switch which cuts off power to the mini-trimmer if released. Hence the user must, as in FIG. 10, keep one hand upon the battery switch while the other hand operates a further switch 311 on the casing of the mini-trimmer. This is a safety feature, helping to ensure that the user cannot injure a hand by bringing it up to the cutter of the mini-trimer while it is running.

The electric motor 306 carries a motor pulley 312 which drives a rotor pulley 314 through a toothed belt 316 and as before the motor pulley is the smaller of the two pulleys, thus providing a speed reduction in the rotor drive. Upper and lower bearings 318, 320 support a shaft 322 carrying both the rotor pulley 314 and rotor 324. In this embodiment the rotor has a twin-start, three-turn helix formed by a pair of helical paddles 326, 328 which terminate at their lower extremities in radially extending blades, one of which is seen at 330. A cut-away plate is shown at 332, being disposed at the otherwise open, lowermost mouth of the casing 304. As before the cut-away plate serves as a fixed blade, enhancing the cutting action.

A path for conveyance of cut material away from the interior of the casing 304 is provided through an opening 334 which leads via a short duct 336 to a waste bag 338. In the illustrated embodiment the waste bag is slung beneath the user's arm but it could for example be carried in the manner of a backpack, in which case a tube would lead from duct 336 to the waste bag.

The mini-trimmer is well suited to light or precision work, such as hedge trimming or even topiary.

Figure 11:
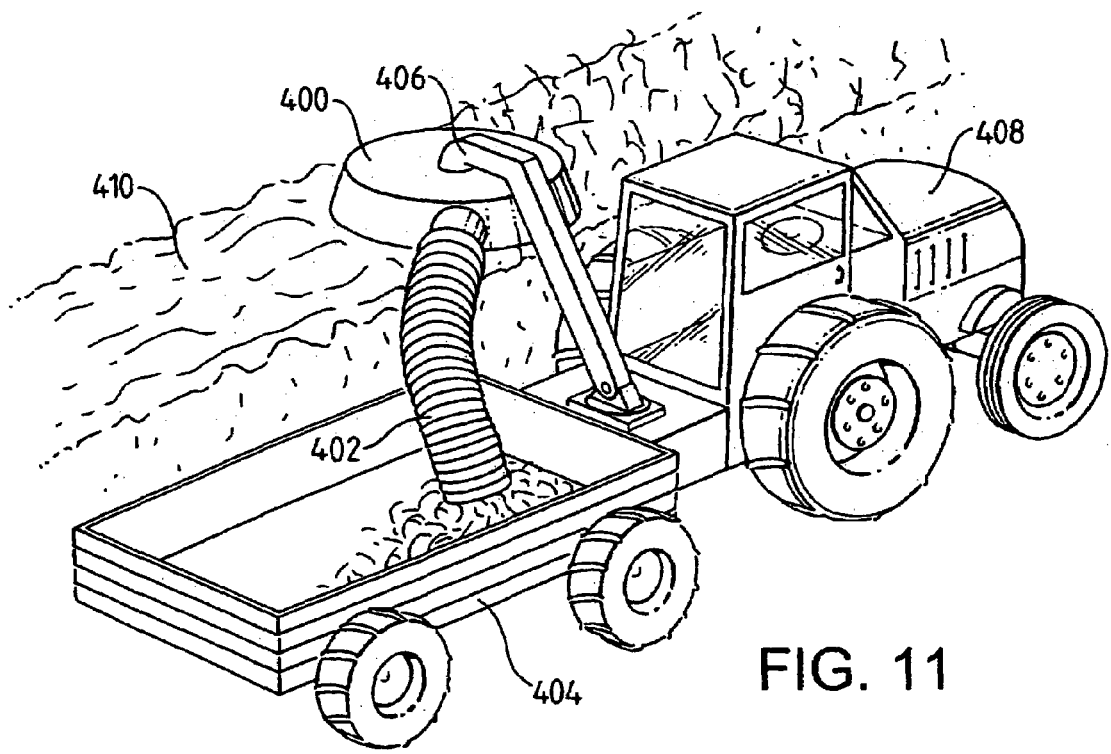
FIGS. 11, 12 and 13 illustrate a larger and more robust embodiment of the present invention in use.
Figure 12:
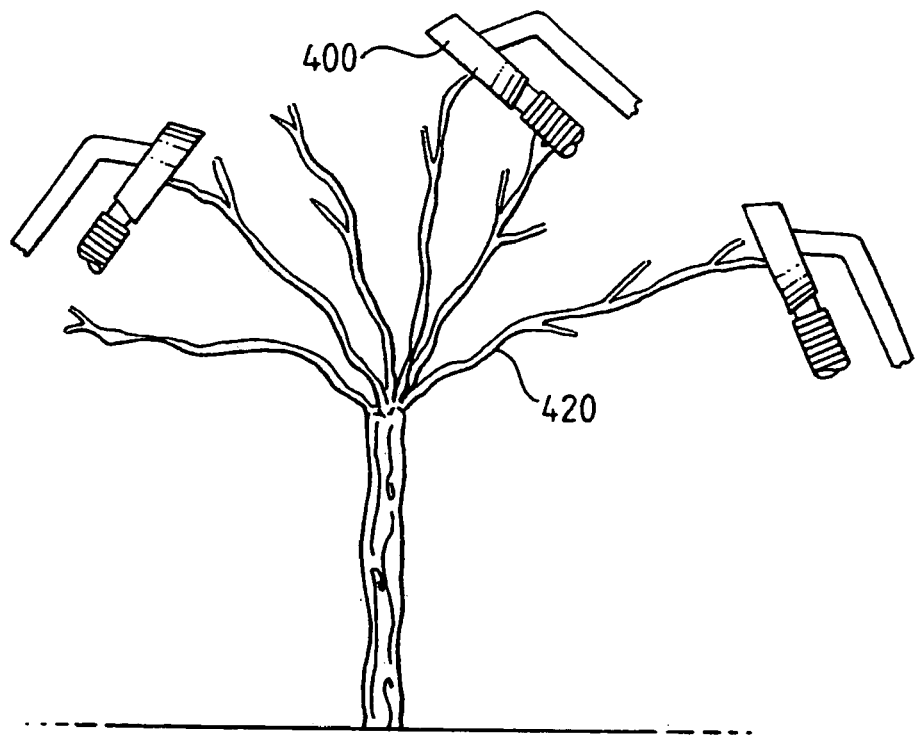
Figure 13:
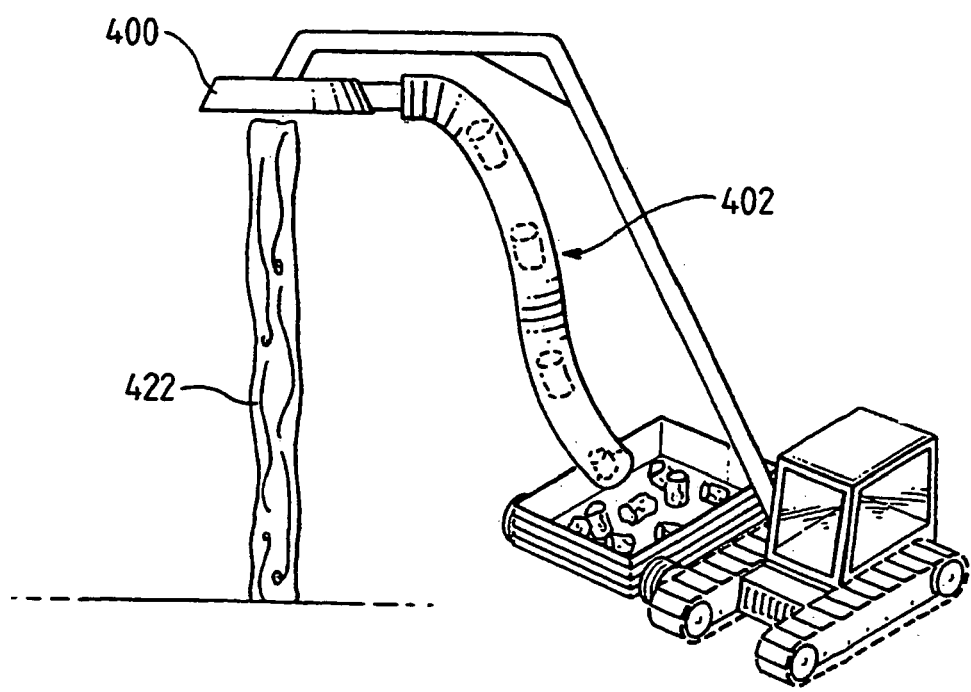

A larger and more powerful embodiment of the present invention is illustrated in use in FIGS. 11, 12 and 13. This version is a vehicle mounted trimmer for use eg. on farms or in parks for such tasks as cutting bushes, hedgerows and even young trees. The trimmer itself is seen at 400 and while its internal components are not illustrated they again comprise a rotor (formed in this embodiment of metal) provided with cutting blades and arranged to centrifugally expel waste, which passes along a flexible duct 402 to a trailer 404 in the present configuration. Drive for the rotor may in this embodiment be provided by a hydraulic motor driven from the hydraulic system of a tractor 408.

A hydraulically movable arm 406 carries the trimmer and preferably allows the angle thereof to be hydraulically altered. The arm is mounted upon the trailer 404, drawn eg. by the tractor 408 to move the trimmer along the hedgerow 410. The arm may alternatively be arranged on the hydraulic platform of the tractor.

A large and powerful version of this type of embodiment may be used in felling and processing trees, as FIGS. 12 and 13 make clear. The trimmer 400 is first used to remove branches 420 (FIG. 12) and is then advanced down the trunk 422 to reduce it to short logs which are, as before centrifugally expelled into a duct 402, formed in this drawing as a robust chute.

Figure 14:
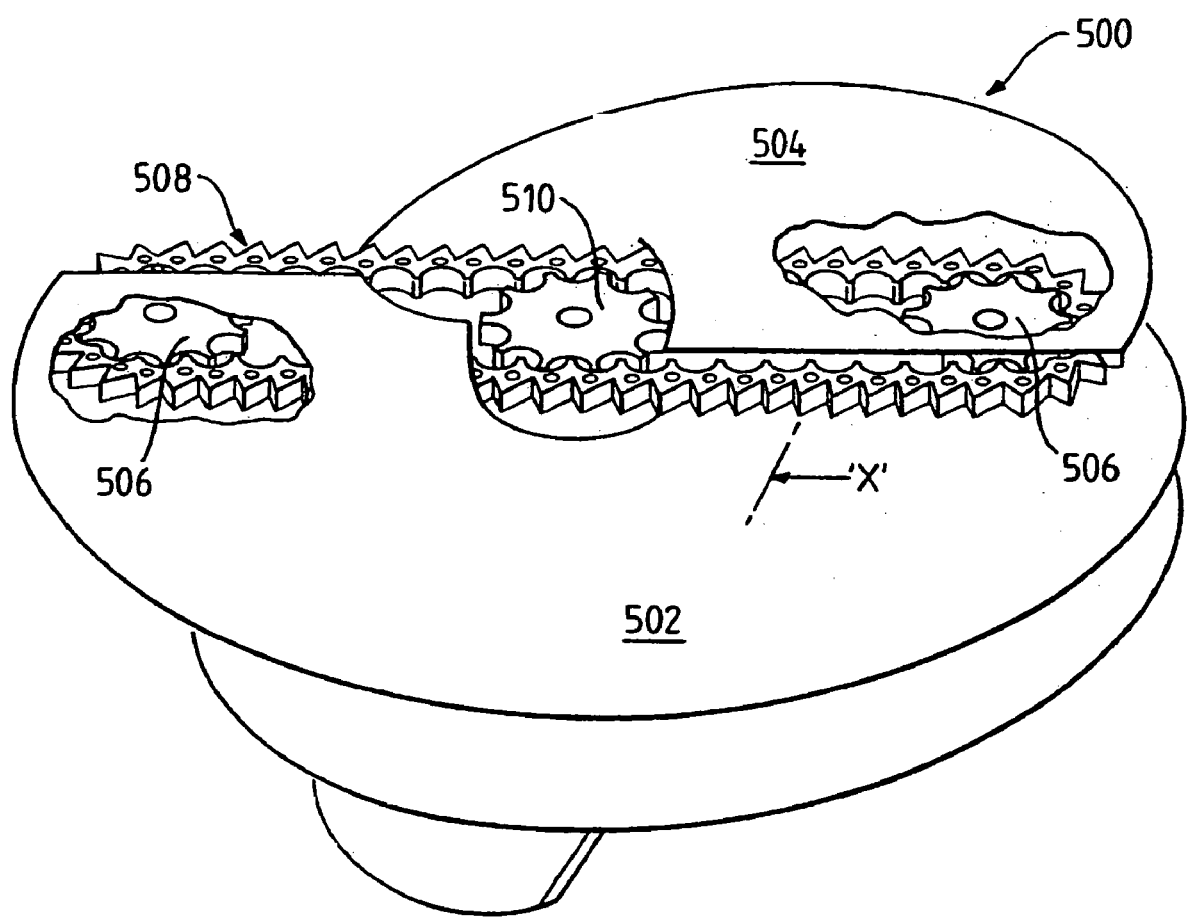
FIG. 14 is a perspective illustration of a further rotor and cutter arrangement for use in embodiments of the present invention.

This embodiment has a rotor and cutter arrangement, illustrated in FIG. 14, which does not utilise a blade as such to cut material. Instead the twin-start, helical rotor paddles 502, 504 both carry a respective outer sprocket 506. A chain saw 508 is led around both sprockets and is driven by a central drive sprocket 510. The arrangement thus provides a spinning chainsaw to serve as the cutter and is therefore capable of rapid and powerful cutting action. As before the rotor serves to collect cut material and to centrifugally propel it to a waste receptacle (not shown).

This rotor and cutter arrangement may alternatively be used in reducing felled timber to wood chips, a log being fed onto the cutters (typically by its own weight, the rotor/cutter being mounted with cutters uppermost and the log descending onto it as it is converted to chips) and the chips being propelled by the rotor into a collection receptacle.

Figure 15:
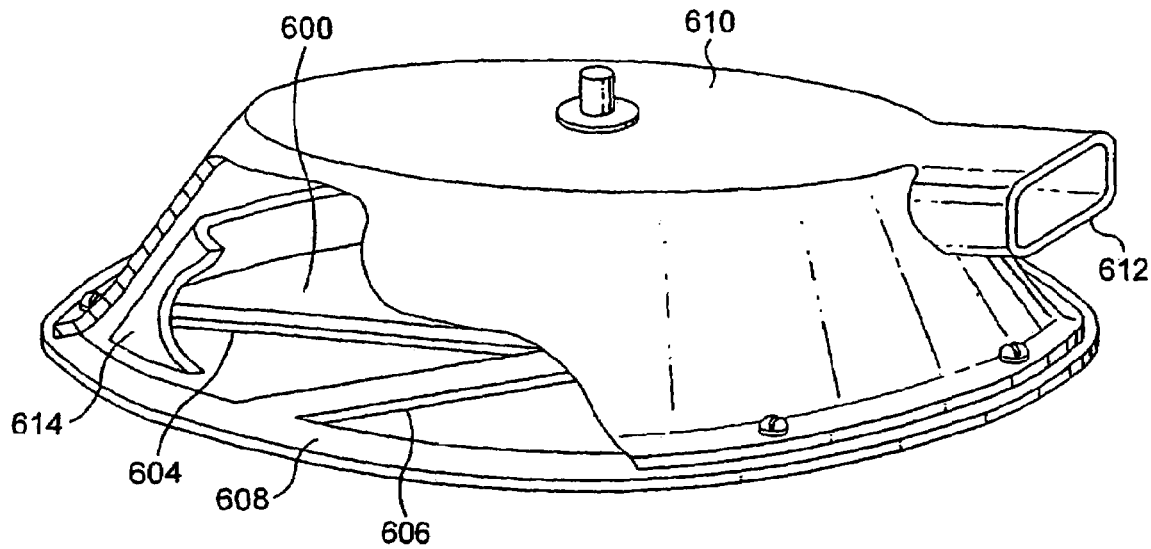
FIG. 15 is a perspective, partly cut-away illustration of yet a further rotor for use in an embodiment of the present invention and of an associated shroud.
Figure 16:
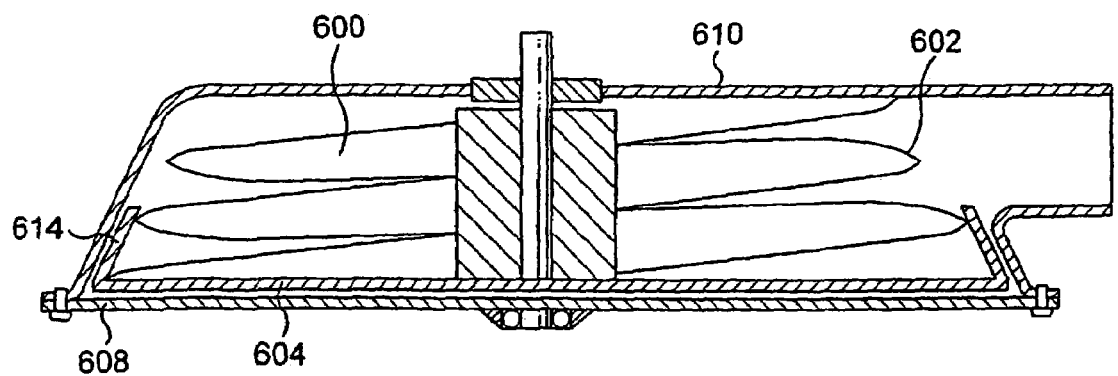
FIG. 16 is a vertical section through the assembly shown in FIG. 15.

Still a further construction of the rotor is illustrated in FIGS. 15 and 16. Here, the rotor 600 again has a twin start helix 602 terminating in a pair of cutting blades 604. Also seen in FIG. 15 is a radially extending fixed blade 606 formed by cut-away plate 608. As in previous embodiments the rotor is surrounded by a shroud, labelled 610 in these drawings, from which a collection channel or duct 612 extends for connection to a waste receptacle.

In this embodiment however the helical rotor is surrounded at a lower region by a helical skirt 614. Consequently the rotor acts in the manner of a true archimedean screw, the cut material being propelled in this way upwards as the lower turns of the helix move past the material. Only when the material is above the skirt 64 is the material thrown out of the rotor to the channel 612.

Figure 18:
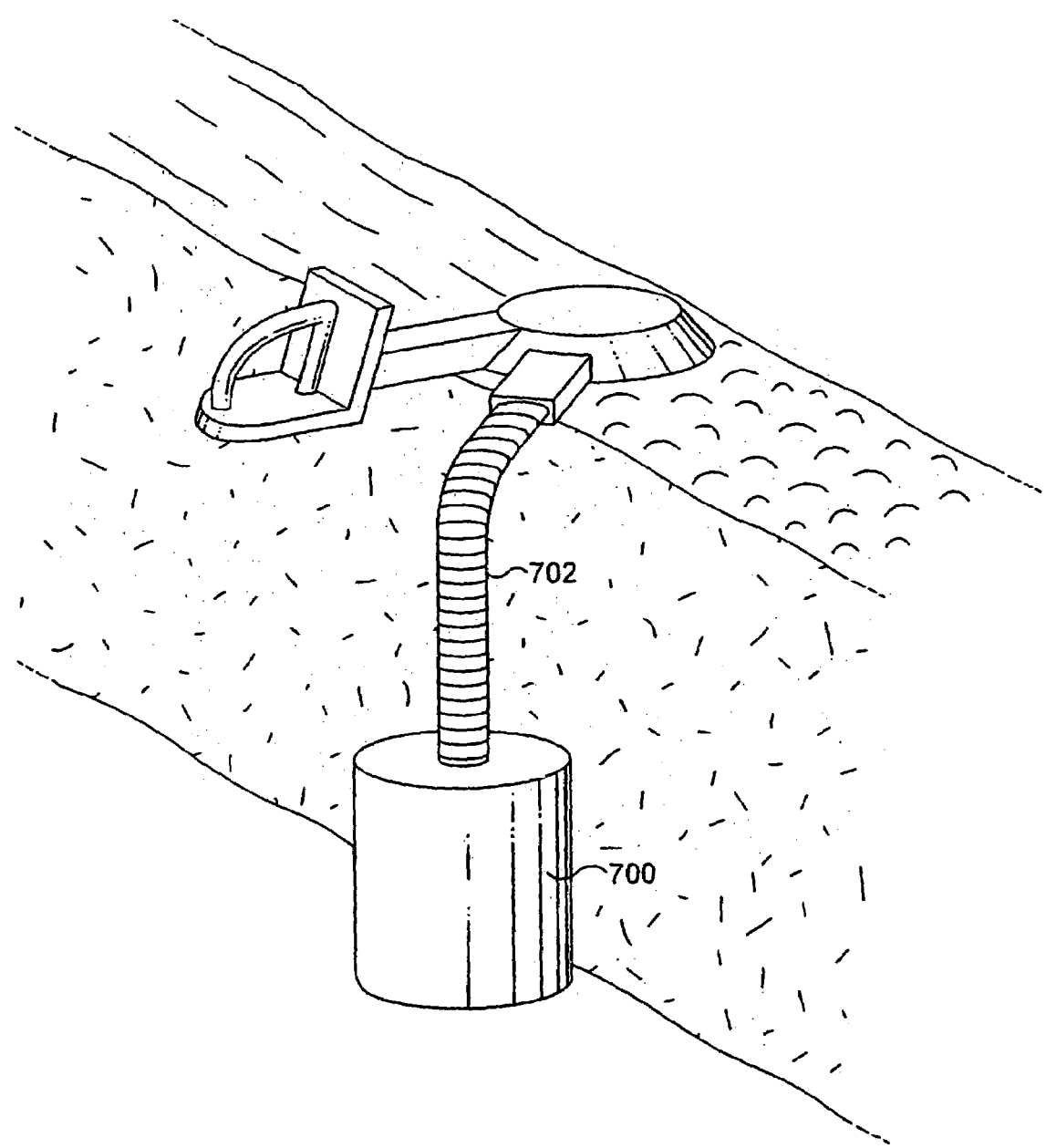
FIG. 18 is an illustration of an embodiment of the present invention in use.
Figure 19:
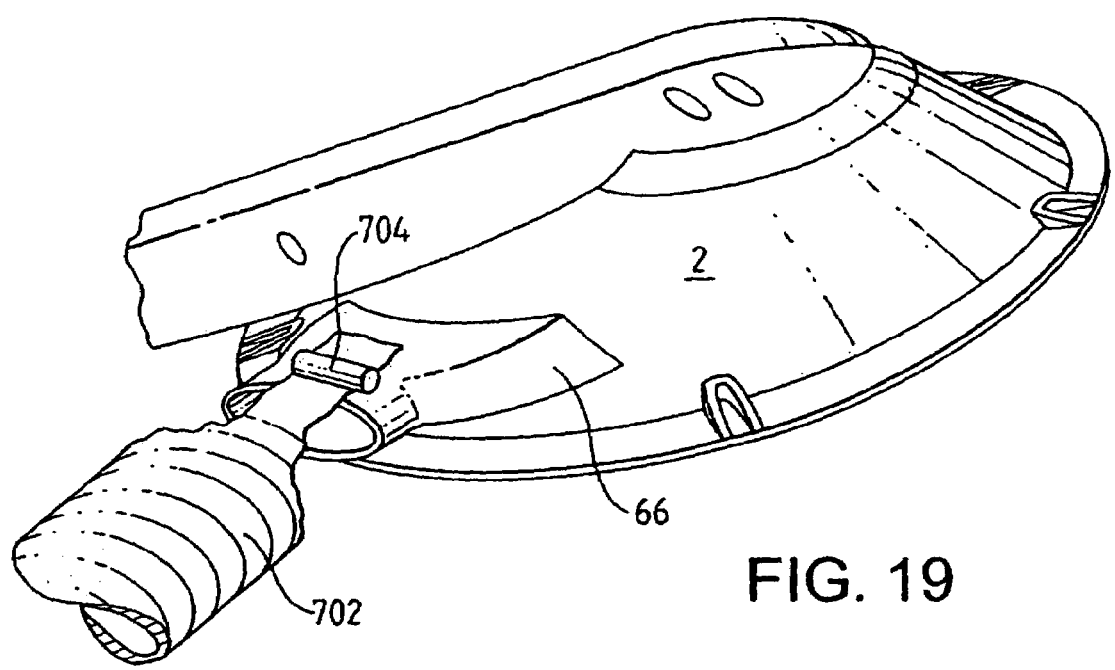
FIG. 19 is an enlarged illustration of selected parts of the embodiment seen in FIG. 18.

FIGS. 18 and 19 illustrate an alternative waste collection arrangement for use with the trimmer 2 illustrated in FIGS. 1 to 5. In FIGS. 18 and 19 the receptacle 68 has been removed and replaced by a bag 700 formed in this embodiment as an impermeable polythene bag fed through a flexible, thin walled extension hose 72 where mouth is clamped to the duct 66 by a tension ring 704, formed in this embodiment of rubber. Waste passes through the hose 702 to the bag 700, which provides a larger volume for receipt of waste than the receptacle 68. The bag 700 and the hose 702 are inflated by air from the duct 66, helping to keep the thin walled hose 702 clear for passage of material. However there is not a through-put of air in the hose and bag, since both are impermeable. Feed of waste material is achieved here due to rotor's "sling-shot" effect and by gravity.

Figure 20:
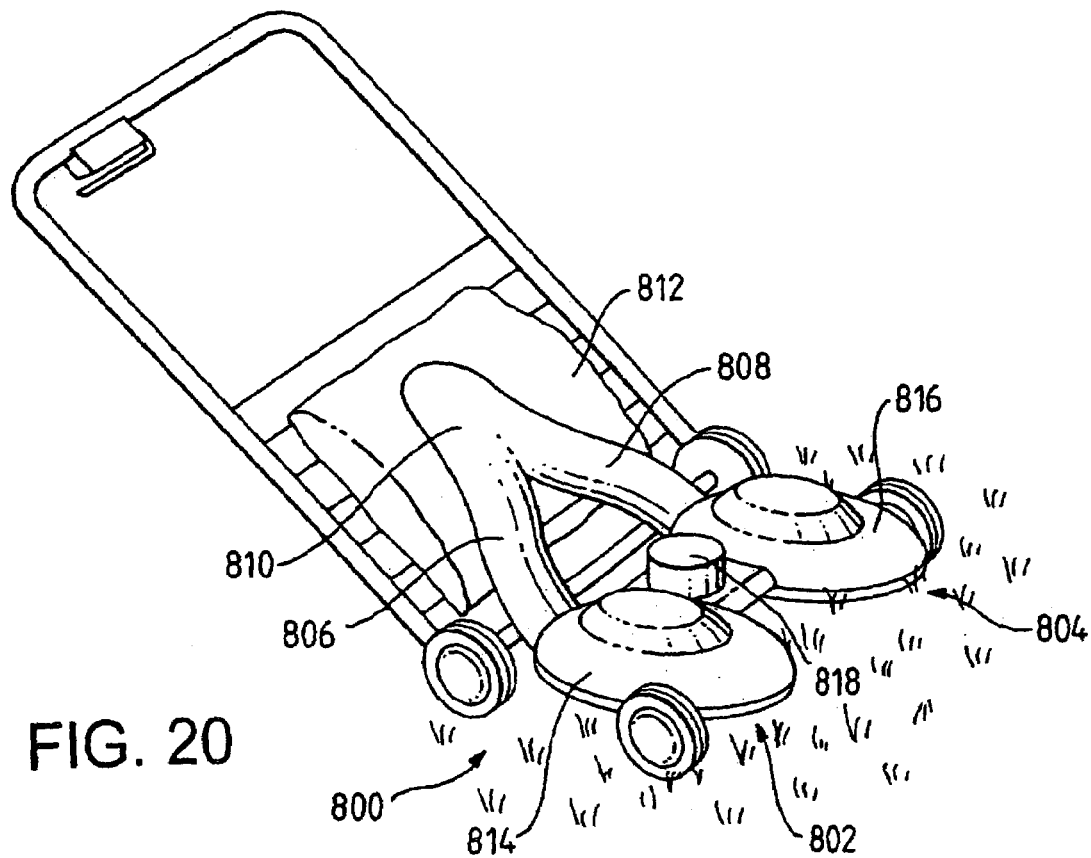
FIG. 20 is an illustration of a lawn mower embodying the present invention.

FIG. 20 illustrates another embodiment of the present invention in the form of a lawn mower. A wheeled chassis 800 carries a pair of cutting heads 802, 804 arranged side-by-side (ie laterally separated) and each utilising a rotor of the general type seen in FIGS. 1 to 5 to cut grass and expel it along respective ducts 806, 808 which feed a common duct 810 itself leading to a collection bag 812. The rotors (hidden from view in the drawing by their respective shrouds 814, 816) share a powered drive 818 which may be an electric motor or internal combustion engine.

The invention claimed is:

1. A hand-held horticultural rotary cutting device comprising a body, a rotor which is housed in the body adjacent an opening therein, and is journalled upon it for rotation about an axis, and a powered drive mounted to the body for rotationally driving the rotor, the rotor having exactly two paddles each having a leading edge forming a radially extending cutter exposed to the exterior of the body by virtue of the aforementioned opening so that the cutters are contactable with material to be cut, each paddle forming at least 180 degrees of a shallow pitched helix and having a trailing edge, the leading edge of each paddle overlapping the trailing edge of the other and so leading it as the rotor turns, each paddle having a collection surface which is inclined along the circumferential direction to its plane of rotation, faces the interior of the body, and follows the cutter as the rotor rotates and each paddle having a vane upstanding from the collection surface, the rotor having a circular outer perimeter and the body having a circular wall which encircles the rotor adjacent its outer perimeter and has an opening leading to a substantially tangential collection channel, so that material cut by the cutter is caused, as the rotor rotates, to ride along the collection surface and so be propelled into a region of the body above the rotor, to be moved rotationally along with the rotor by the vanes, and then to be centrifugally expelled into the collection channel for collection in a receptacle, the device further comprising a plate which is mounted across the opening in the body and is cut away to form multiple static blades which are adjacent the plane of rotation of the cutters, the rotor being journalled in an upper bearing mounted in the body and a lower bearing, on the opposite side of the rotor from the upper bearing, mounted by the aforesaid plate.

2. A device as claimed in claim 1, wherein the rotor is shaped to function as an impeller, propelling air into the body.

3. A device as claimed in claim 1, wherein the powered drive is an electric motor coupled to the rotor by a belt drive and housed in the body.

4. A device as claimed in claim 3, having a carrying handle formed by or coupled to the body at a region between the rotor and the motor.

5. A device as claimed in claim 4 for two handed use, having a second handle formed by or coupled to an end region of the body remote from the rotor.

6. A device as claimed in claim 5 wherein the said end region of the body houses the motor.

7. A device as claimed in claim 1 wherein the rotor and cutter comprise a unitary plastics moulding.

8. A device as claimed in claim 1, adapted to be carried and used one handed.

9. A device as claimed in claim 1 which is electrically connected to a separate battery pack for driving the powered drive which is formed as an electric motor, the battery pack carrying a switch which stops the device if it is released.

10. A device as claimed in claim 9 wherein the battery pack is coupled to a harness by means of which the battery pack can be worn upon a user's body.

11. A device as claimed in claim 1 mounted upon a wheeled carriage with an upstanding handle.

12. A device as claimed in claim 1, wherein a skirt is provided which surrounds at least a lower portion of the rotor and rotates therewith.

13. A device as claimed in claim 1 comprising a pair of switches mounted at separate locations such that the user is required to use both hands to activate the respective switches in order to activate the powered drive, which is de-activated upon release of either switch.

14. A device as claimed in claim 1 comprising a rotor brake which is automatically applied upon de-activation of the powered drive.

15. A device as claimed in claim 1 which is a horticultural or agricultural device.

* * * * *